(12) United States Patent
Kido et al.

(10) Patent No.: US 10,391,570 B2
(45) Date of Patent: Aug. 27, 2019

(54) SMALL HOLE ELECTRIC DISCHARGE MACHINE

(71) Applicant: MAKINO MILLING MACHINE CO., LTD., Tokyo (JP)

(72) Inventors: Hiromichi Kido, Mason, OH (US); Tomohiro Nagase, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 316 days.

(21) Appl. No.: 15/259,836

(22) Filed: Sep. 8, 2016

(65) Prior Publication Data

US 2018/0065199 A1 Mar. 8, 2018

(51) Int. Cl.
*B23H 1/00* (2006.01)
*B23H 7/26* (2006.01)
*B23H 9/14* (2006.01)
*B23H 9/10* (2006.01)

(52) U.S. Cl.
CPC .............. *B23H 1/00* (2013.01); *B23H 7/265* (2013.01); *B23H 9/14* (2013.01); *B23H 9/10* (2013.01); *B23H 2500/00* (2013.01)

(58) Field of Classification Search
CPC . B23H 1/00; B23H 9/14; B23H 7/265; B23H 2500/00; B23H 9/10
See application file for complete search history.

(56) References Cited

U.S. PATENT DOCUMENTS

| 7,329,825 | B2 | 2/2008 | Awakura | |
|---|---|---|---|---|
| 9,839,970 | B2* | 12/2017 | Peters | B23K 9/121 |
| 2005/0077269 | A1* | 4/2005 | Yokomichi | B23H 1/10 |
| | | | | 219/69.2 |
| 2012/0132623 | A1* | 5/2012 | Justice, Jr. | B23H 7/265 |
| | | | | 219/69.15 |
| 2015/0239056 | A1* | 8/2015 | Hamada | B23H 9/10 |
| | | | | 700/162 |

FOREIGN PATENT DOCUMENTS

WO    WO-2012074897    6/2012

* cited by examiner

*Primary Examiner* — Ibrahime A Abraham
*Assistant Examiner* — Biniam B Asmelash
(74) *Attorney, Agent, or Firm* — Morrison & Foerster LLP (57) ABSTRACT

A small-hole electric discharge machine (100) applying voltage between a small-hole machining-use electrode (116) attached to a spindle (112) and a workpiece (130) attached to a table (118) to drill a small hole in a workpiece by electric discharge energy, the small-hole electric discharge machine including an electrode guide (10) having a hollow part through which the electrode is passed and guiding the electrode at the front end of the hollow part in a parallel state with respect to an axis (Rz) of the spindle while shifted by a predetermined distance (S) from the axis and a W-axis chuck (144) holding an electrode guide to be able to measure and maintain a position of a front end of the electrode guide in direction of the axis of the spindle and an angular position about the axis.

6 Claims, 7 Drawing Sheets

SMALL HOLE ELECTRIC DISCHARGE MACHINE

BACKGROUND OF THE INVENTION

1. Field of the Invention

The present invention relates to a small-hole electric discharge machine using a rod-shaped or pipe-shaped elongated electrode to drill a small hole in a workpiece by electric discharge machining.

2. Description of the Related Art

The electrode of a small-hole electric discharge machine normally extends straight on an extension of the axis of the spindle of the machine. However, workpieces are complicated in shape and the space around the machined part of a workpiece is narrow. For these and other reasons, with an electrode extending straight, sometimes the machined part could not be accessed. For this reason, sometimes an electrode with a curved front end part described in WO2012/074897 (hereinafter, called "PLT 1") is used. In the invention of PLT 1, the electrode is bent 90 degrees with respect to the spindle. Further, related art using a slanted electrode bent to an angle less than 90 degrees has also been proposed.

If using an electrode bent 90 degrees with respect to the spindle or an electrode extending at a slant from the spindle, the front end position of the electrode will be moved away from the extension of the spindle and the direction of drilling will no longer match the direction of the spindle (Z-axial direction). Normally, the operator and machining programmer understand that the drilling is performed in the Z-axial direction, so using an electrode bent 90 degrees or an electrode extending at a slant requires a special and complicated approach from the operator and machining programmer. For this reason, it becomes difficult to accurately position the electrode at a machining point. The machining program also increases in complexity.

SUMMARY OF INVENTION

The present invention is made in view of the above situation and has as its object the provision of a small-hole electric discharge machine able to drill a small hole not on a straight line with the spindle in a workpiece by small-hole electric discharge machining, which small-hole electric discharge machine can accurately position the electrode at a machining point and can drill the small hole without complicating the machining program.

To achieve the above object, according to the present invention, there is provided a small-hole electric discharge machine applying voltage between a small-hole machining-use electrode attached to a spindle and a workpiece attached to a table to drill a small hole in the workpiece by electric discharge energy, the small-hole electric discharge machine comprising an electrode guide having a hollow part through which the electrode is passed and guiding the electrode at the front end of the hollow part in a parallel state with respect to an axis of the spindle while shifted by a predetermined distance from the axis, and an electrode guide support device supporting the electrode guide so that a position of the front end of the electrode guide in direction of the axis of the spindle and an angular position about the axis become predetermined values.

In the present invention, although the axis of the front end part of the electrode is shifted from the axis of the spindle by exactly a predetermined distance, it is parallel with the axis of the spindle. For this reason, if just considering the amount of shift, it becomes possible to position the electrode at a machining point not on a straight line with the spindle and to prepare a machining program by substantially an equal ease as an electrode extending straight on the axis of the spindle. In other words, according to the present invention, it becomes possible to position the electrode at a machining point not on a straight line with the spindle and prepare a machining program far easier compared with a type described in PLT 1 where the electrode is bent 90 degrees with respect to the spindle or type where it extends at a slant.

DESCRIPTION OF THE PREFERRED EMBODIMENTS

Figure 1:
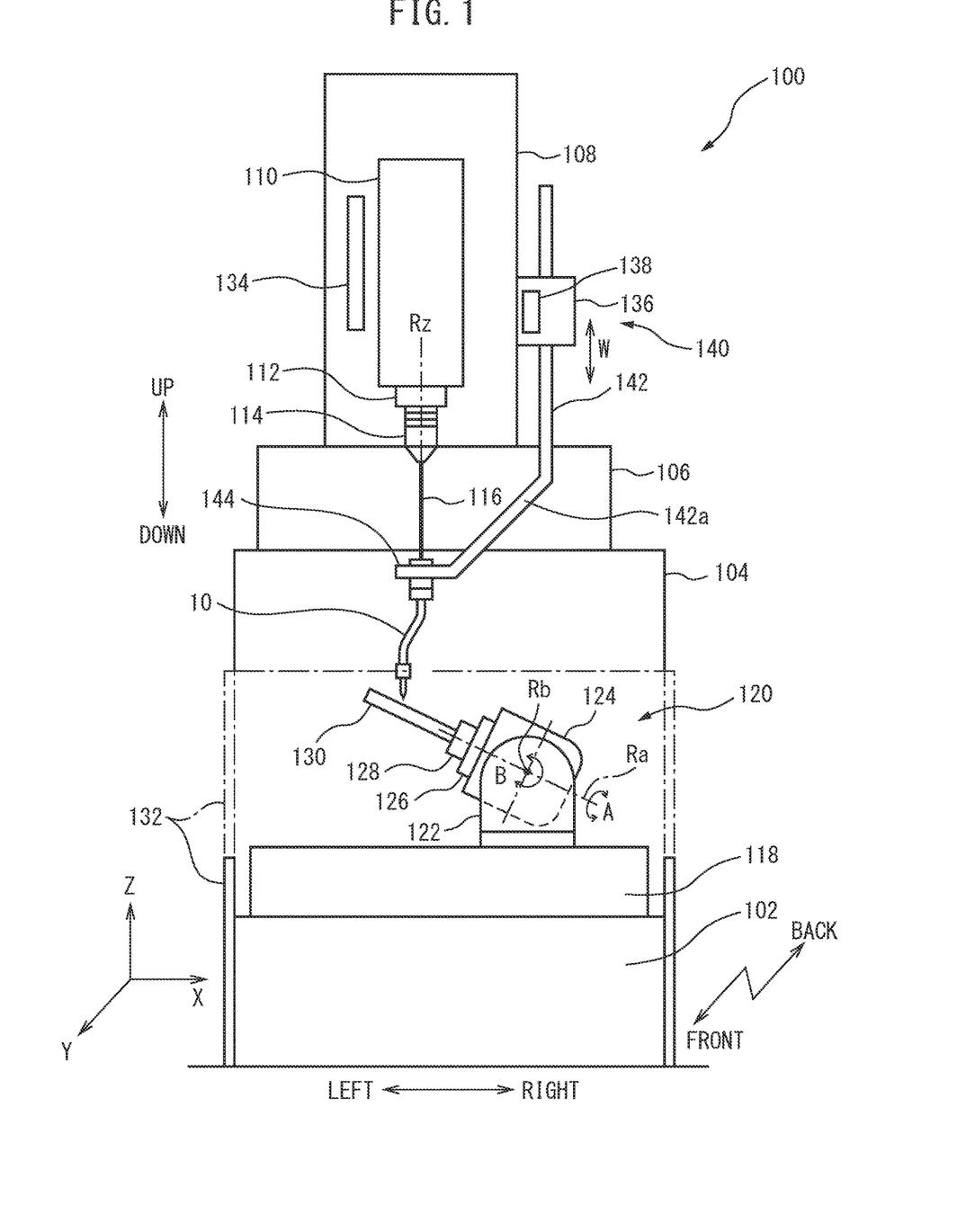
FIG. 1 is a front view schematically showing the main configuration of an electric discharge machine according to a first embodiment.

Below, referring to FIG. 1 to FIG. 5, a small-hole electric discharge machine according to a first embodiment of the present invention will be explained. FIG. 1 is a front view schematically showing the component elements of a small-hole electric discharge machine (hereinafter, abbreviated as "electric discharge machine") 100 according to the first embodiment. Note that, below, for convenience's sake, as illustrated, the three perpendicular axial directions (X-axial direction, Y-axial direction, and Z-axial direction) will sometimes be referred to as the left-right direction, front-back direction, and up-down direction.

In FIG. 1, a column 104 is provided vertically at a back part of a bed 102 forming the base. On the top surface of the column 104, an X-slider 106 is supported to be able to move in the X-axial direction. On the top surface of the X-slider 106, a ram 108 is supported to be able to move in the Y-axial direction. At the front surface of the ram 108, a spindle head 110 is supported to be able to move in the Z-axial direction. At the spindle head 110, a spindle 112 is supported to be able to rotate about the axis Rz. At the front end part of the spindle 112 sticking out from the bottom surface of the spindle head 110, an electrode holder 114 is attached.

At a side surface of the ram 108, a W-axial guide assembly 140 is attached. The W-axial guide assembly 140 has a guide arm 142 supported on a bracket 136 provided at the right side surface of the ram 108 to be able to move in the up-down direction. This axis of up-down movement of the guide arm 142 is defined as a W-axis. The W-axis is parallel to the Z-axis. A bottom end part 142a of the guide arm 142 is slanted inward with respect to the W-axis or Z-axis. At a front end part of the bottom end part 142a, a W-axis chuck 144 is provided. The W-axis chuck 144 is an electrode guide support device described in the claims and supports a later explained electrode guide assembly 10.

Between the electrode holder 114 and the electrode guide assembly 10, an electrode 116 extending along the axis Rz is exposed. While not represented in FIG. 1, the electrode 116 is exposed in a short length from the front end part of the electrode guide assembly 10 as well. The exposed end part of the electrode 116 is the machining part where electric discharge occurs. Further, machining fluid is ejected from the front end of the electrode 116. In the present embodiment, the electrode 116 is a pipe electrode having a machining fluid channel for ejecting for example water or another machining fluid from the front end. However, as the electrode 116, a solid electrode through which machining fluid cannot pass may also be used.

The electrode 116 is held at its top end part by the electrode holder 114. During the machining, the spindle 112 rotates about the axis Rz whereby the electrode holder 114 rotates about the axis Rz and the electrode 116 held by the electrode holder 114 also rotates. The bottom end part of the electrode 116 is supported by the electrode guide assembly 10 to be able to rotate so as to extend in parallel with the axis Rz. Along with progress in the electric discharge machining, the front end of the electrode 116 is consumed, but along with consumption of the electrode 116, the spindle head 110 descends with respect to the guide arm 142, so the position of the front end of the electrode 116 in the Z-axial direction can be made a desired position.

At the top surface of the bed 102, a table 118 is arranged at the front of the column 104. At the top surface of the table 118, a tiltable rotary table device 120 is carried. The tiltable rotary table device 120 has a pair of front and back support members 122 sticking out from the top surface of the table 118 upward, a tilting member 124 supported between the front and back support members 122 to be able to pivot in the B-axial direction about a pivot axis Rb extending in the Y-axial direction, and a rotary table 126 supported at the left end face of the tilting member 124 to be able to rotate in an A-axial direction about a rotation axis Ra perpendicular to the pivot axis Rb. The rotary table 126 is provided with a chuck 128, while the chuck 128 has a workpiece 130 attached to it.

Figure 3:
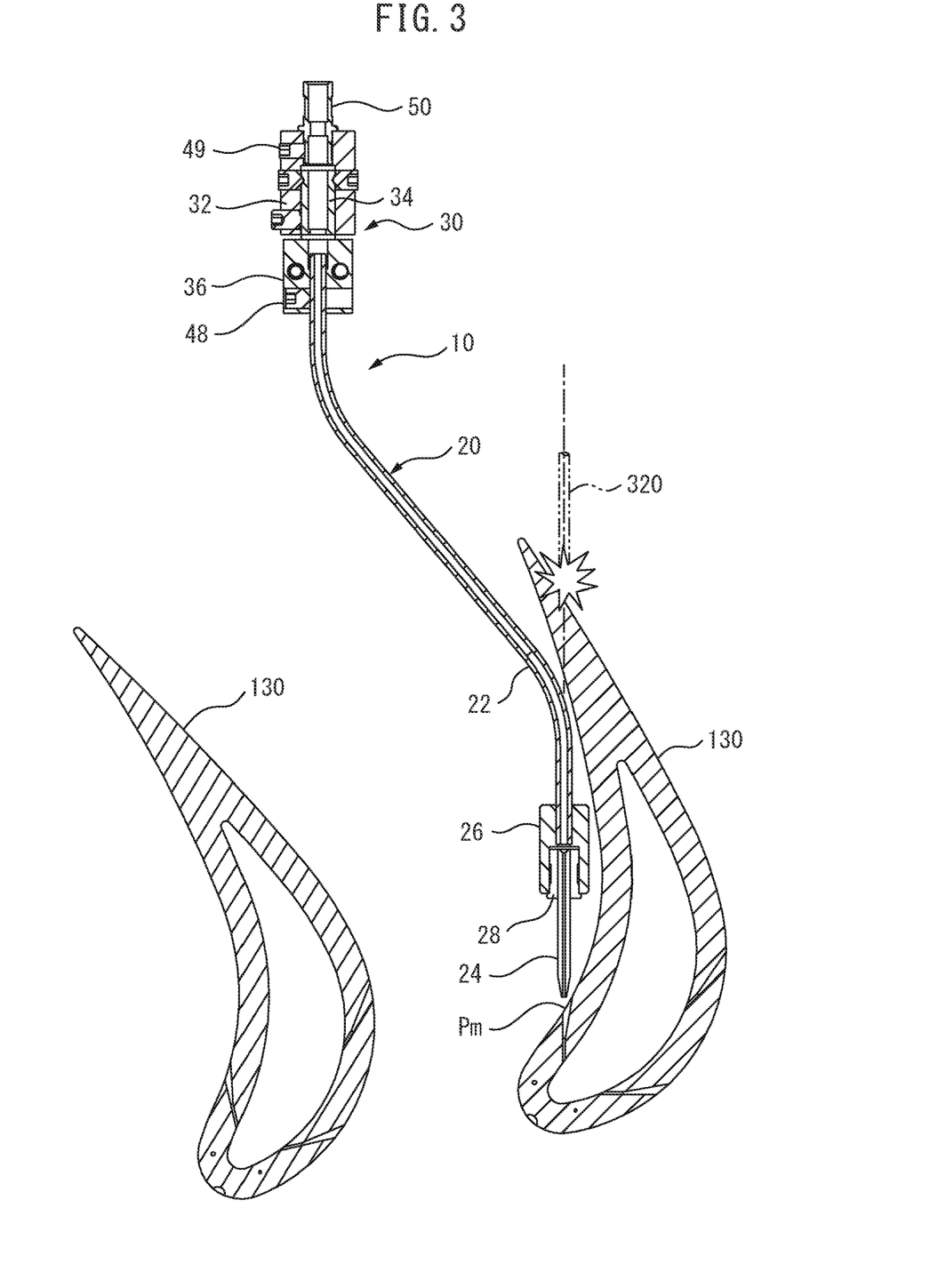
FIG. 3 is a sectional view adding the cross-section of a workpiece to the longitudinal-section of the electrode guide assembly of FIG. 2.

In this specification, the workpiece 130 is, for example, a turbine blade or vane used in a gas turbine. The turbine blade is exposed to gas of a high temperature of 1000° C. to 1500° C. or so, so a nickel alloy with a high heat resistance is used as the component member. At the surface of this turbine blade, a plurality of cooling holes having diffusers through which cooling air for cooling the surface of the turbine blade are formed in different directions (FIG. 3).

Around the table 118, an elevatable machining tank 132 is provided so as to surround the table 118 and tiltable rotary table device 120 as a whole. Note that, in FIG. 1, the one-dot chain line shows the machining state where the machining tank 132 has risen. At the time of setup work and other nonmachining states, the machining tank 132 descends as shown by the solid line.

While not shown, the electric discharge machine 100 of FIG. 1 has an X-axial drive unit making the X-slider 106 move in the left-right direction, an Y-axial drive unit making the ram 108 move in the front-back direction, a Z-axial drive unit making the spindle head 110 move in the up-down direction, a spindle drive unit making the spindle 112 rotate about the axis Rz, a W-axial drive unit making the guide arm 142 move in the up-down direction, a B-axial drive unit making the tilting member 124 tilt through the pivot shaft Rb, and an A-axial drive unit making the rotary table 126 rotate through the pivot axis Ra. These X-axial drive unit, Y-axial drive unit, Z-axial drive unit, W-axial drive unit, spindle drive unit, B-axial drive unit, and A-axial drive unit are controlled by an NC device (not shown) of the electric discharge machine 100.

Due to the above configuration, the electrode holder 114 and the electrode guide assembly 10 can move relative to the workpiece 130 in the X-axial direction, Y-axial direction, and Z-axial direction and can move relatively in the B-axial direction and A-axial direction. Further, due to the elevating action of the spindle head 110 with respect to the guide arm 142, despite a change of length of the electrode 116 due to consumption of the electrode 116, the top and bottom end parts of the electrode 116 can be supported at all times during machining by the electrode holder 114 and the electrode guide assembly 10.

At the front surface of the ram 108, a linear scale or other position detector 134 detecting a Z-axis position of the spindle head 110 in the up-down direction is provided. Due to a signal from the position detector 134, further, it is possible to use a reference block (not shown) provided on the table 118 and a contact detection function inherently possessed by the small-hole electric discharge machine 100 to detect the position of the front end part of the electrode holder 114 and the position of the front end part of the electrode 116. At the bracket 136 of the guide arm 142, a position detector 138 such as a linear scale detecting the W-axis position of the guide arm 142 with respect to the ram 108 in the vertical direction is provided. If utilizing the above contact detection function, since the shape of the guide arm 142 is known, the position of the W-axis chuck 144 and the position of the front end part of the electrode guide assembly 10 can be determined from the values of X-axis and Y-axis position detectors (not shown) and the W-axis position detector 138.

Figure 2:
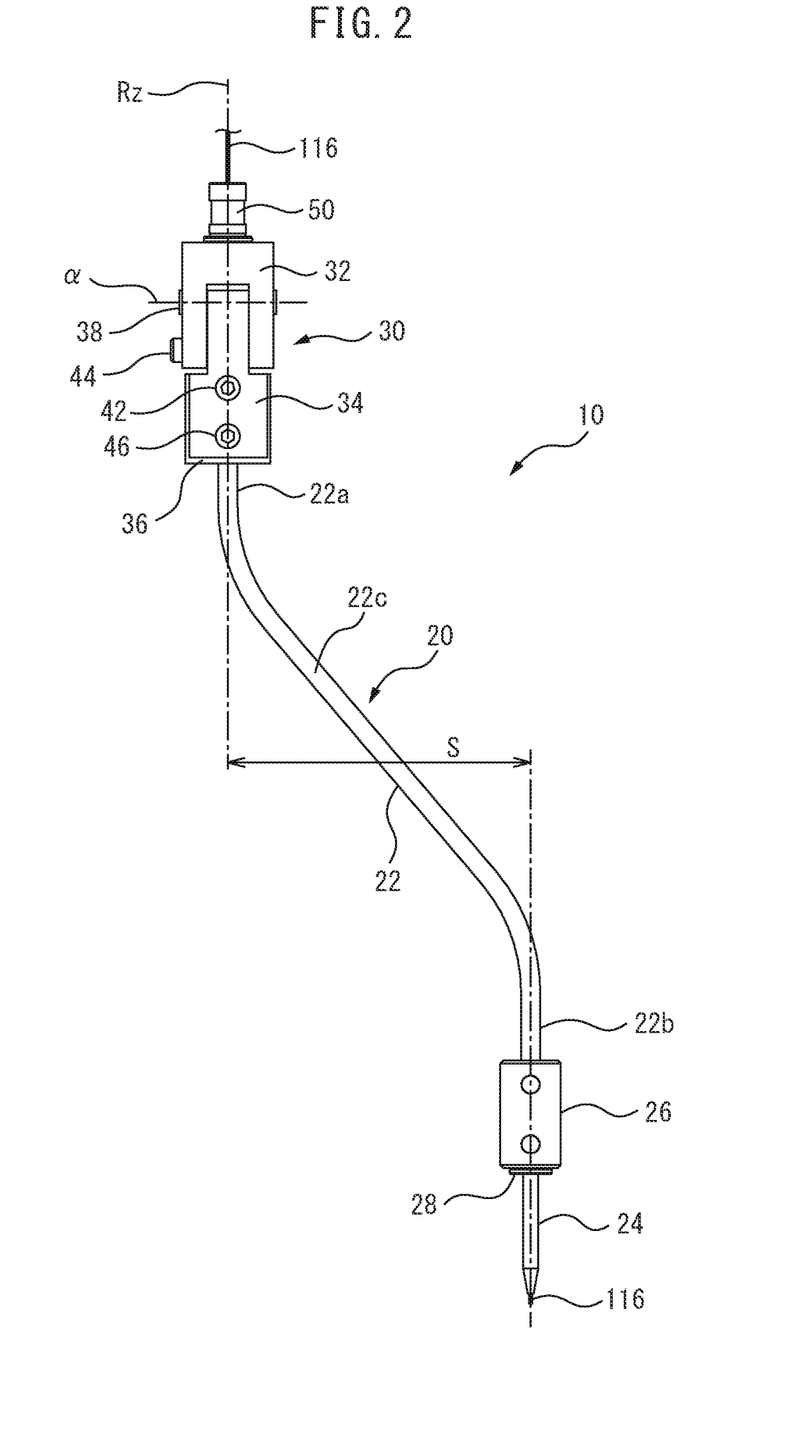
FIG. 2 is a front view of an electrode guide assembly in the first embodiment.
Figure 4:
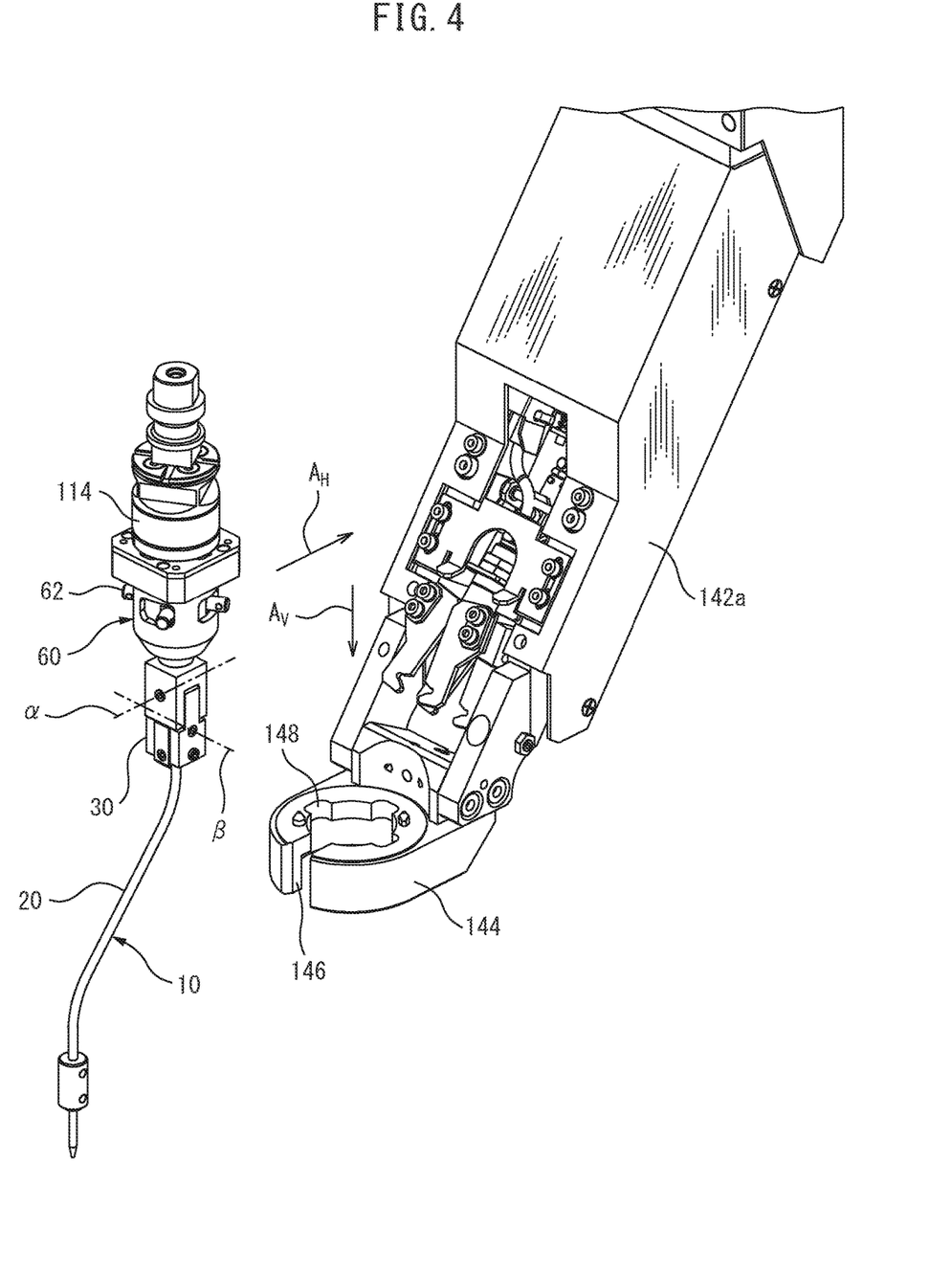
FIG. 4 is a perspective view showing the state of an electrode guide assembly attached to a W-axis chuck.
Figure 5:
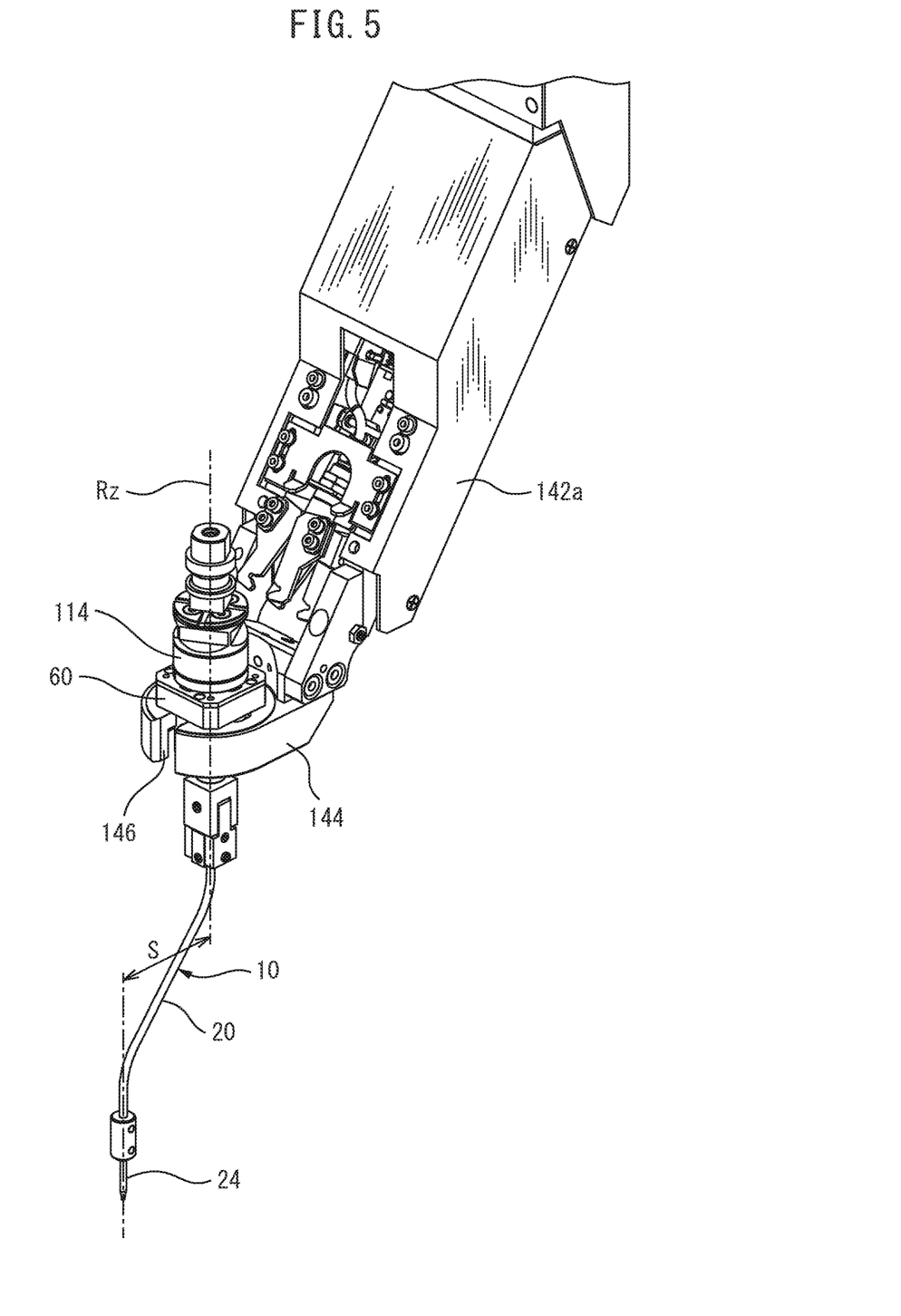
FIG. 5 is a perspective view of an electrode guide assembly attached to the W-axis chuck.

FIG. 2 is a front view of the electrode guide assembly 10 without a shuttle 60 (FIG. 4 and FIG. 5). FIG. 3 is a longitudinal-sectional view of the electrode guide assembly 10 of FIG. 2 and also a cross-sectional view of a workpiece comprised of the turbine blade 130. Note that, in FIG. 3, to clarify the electrode guide assembly 10, the electrode 116 is not shown. The electrode guide assembly 10 is provided with a guide tube 20 bent into a substantially Z-shape or substantially crank shape including an obtuse angle, a parallelism adjusting unit 30 connected with the top end of the guide tube 20, a connecting part 50 fastened to the top end part of the parallelism adjusting unit 30, and a shuttle 60, not shown in FIG. 2, engaged with the W-axis chuck 144 and electrode holder 114 in a detachable manner.

The guide tube 20 is configured by a large diameter tube 22 exhibiting the above substantially crank shape and having a relatively large inside diameter into which the electrode 116 can be inserted, a small diameter tube-shaped positioning guide 24 guiding the front end part of the electrode by a minimum extent of clearance and having a relatively small inside diameter, and a connecting member 26 connecting these large diameter tube 22 and positioning guide 24. The large diameter tube 22 has a top straight part 22a extending along the axis Rz, a bottom straight part 22b extending in parallel to the top straight part 22a, and a slanted part 22c connecting the top straight part 22a and bottom straight part 22b. The bottom straight part 22b is shifted by exactly a distance S from the top straight part 22a. The slanted part 22c is connected with the top straight part 22a and bottom straight part 22b by curved parts. Further, the axial lines of these intersect at an obtuse angle. Note that, in the present embodiment, the angle is obtuse, but a right angle or acute angle may also be possible. In the present embodiment, the large diameter tube 22 of the guide tube 20 is formed from a metal material. For this reason, it is possible to maintain the shape shown in FIG. 2 independently. This metal large diameter tube 22 is covered at its inside surface by glass so as to electrically insulate it from the electrode. The positioning guide 24 is made using ceramic or sapphire as a material. Note that, the large diameter tube 22 may also be made by a plastic or other material so long as the shape can be maintained. Further, it may also be made of a material provided with both flexibility and rigidity like a coolant nozzle of a machine tool and configured to enable change of the amount of shift.

The connecting member 26 connecting the bottom straight part 22b of the large diameter tube 22 and the positioning guide 24 is formed in a cylindrical shape. At a hole formed along the axis of that cylinder, a front end of the bottom straight part 22b of the large diameter tube 22 is inserted to fix it in place. At a hole formed in the bottom part of that along the axis of the connecting member 26, a positioning guide 24 is fixed in place through a sleeve 28. The axis of the positioning guide 24 of the electrode guide assembly 10 attached by the shuttle 60 to the W-axis chuck 144 becomes parallel to the axis Rz of the spindle. The positioning guide 24 slidably supports the outer circumferential surface of the electrode 116 at its inner circumferential surface and has a taper-shaped front end part comprised of a hollow shape member having an inside diameter slightly larger than the electrode 116 for avoiding interference with the workpiece 130 so as to constrain movement of the electrode 116 in the diametrical direction (rattling) while enabling accurate positioning of the electrode 116 facing the machining point of the surface of the workpiece 130.

The parallelism adjusting unit 30 is provided for adjusting the parallelism of the axis of the positioning guide 24 with respect to the axis Rz of the spindle 112. In other words, it is provided so that, when attaching the electrode guide assembly 10 to the W-axis chuck 144 through the shuttle 60, the parallelism of the axis of the positioning guide 24 with respect to the axis Rz of the spindle 112 is kept in a predetermined range of allowable error.

The parallelism adjusting unit 30 is provided with a first joint 32 fixed through connecting part 50 to the shuttle 60 and having an inverted U-shape when viewed from the side, a second joint 34 connected to the first joint 32 and having a projecting shape when viewed from the side, and a third joint 36 connected to the second joint 34 and having a plate shape. Further, it is also provided with a vertical hole passing through the centers of these in the Z-axial direction so as to pass the electrode 116. The parallelism adjusting unit 30 is provided with two axes perpendicularly intersecting each other and perpendicularly intersecting the axis Rz as well, that is, the first axis $\alpha$ and second axis $\beta$ (FIG. 4).

The parallelism adjusting unit 30 is configured so that the second joint 34 can pivot about the first axis $\alpha$ with respect to the first joint 32 and so that the third joint 36 can pivot about the second axis $\beta$ with respect to the second joint 34. The first axis $\alpha$ is formed by a pair of first setscrews 38 with cone points, while the second axis $\beta$ is formed by a pair of second setscrews 42 with cone points. A third setscrew 44 for locking the second joint 34 with the first joint 32 by a desired angle is provided at the first joint 32, while a fourth setscrew 46 for locking the third joint 36 with the second joint 34 by a desired angle is provided at the second joint 34. At the vertical hole of the third joint 36, the top end part of the large diameter tube 22 of the guide tube 20 is inserted and fixed in place by a fifth setscrew 48.

In this regard, the fact that the parallelism adjusting unit is not limited to the one explained above and can be made various forms will be understood by a person skilled in the art. On the other hand, when the parallelism of the axis of the positioning guide 24 with respect to the axis Rz is obtained by a high precision, an electrode guide assembly not having a parallelism adjusting unit may also be possible.

The connecting part 50 is provided for connecting the parallelism adjusting unit 30 connected to the guide tube 20 to the shuttle 60. Further, it is formed by a pipe member through which the electrode 116 can be inserted. The connecting part 50 is fixed in place by the bottom part being inserted into the vertical hole of the first joint 32 and being fixed by a sixth setscrew 49. The top part sticks out upward from the first joint 32. The connecting part 50 is inserted inside the shuttle 60 and fixed in place by screws.

The shuttle 60 is attached at its top surface to the electrode holder 114 in a detachable manner. The shuttle 60 is further attached as its side surface to the W-axis chuck 144 in a detachable manner. In the example of FIG. 4, the shuttle 60 has a plurality of lock pins 62 engaging with engagement recesses 148 formed at the inside of the W-axis chuck 144.

In this regard, the electric discharge machine 100, while not illustrated, has an electrode magazine at the side of the W-axial guide assembly 140 in a known manner. Inside the electrode magazine, for example, a plurality of types of electrode guide assemblies 10 including shuttles 60 and with different amounts of shift S are stored assembled together with respectively compatible electrodes 116 and electrode holders 114. When exchanging an electrode 116, an electrode holder 114 to which an electrode guide assembly 10 including an electrode 116 and shuttle 60 is connected is gripped by an arm of a known electrode exchange device and exchanged between the spindle 112 and the electrode magazine. The configurations of the shuttle 60 and electrode exchange utilizing the shuttle 60 and electrode holder 114 are described in the specification of U.S. Pat. No. 7,329,825 (Japanese Patent No. 4721898) of the same assignee, so a detailed explanation will be omitted here. Note that, the shuttle 60, electrode holder 114, and W-axis chuck 144 respectively correspond to the electrode guide holder 25, electrode holder 23, and gripper section 39 in U.S. Pat. No. 7,329,825.

The electrode guide assembly 10 can be automatically exchanged by suitably controlling the X-axial drive unit, Y-axial drive unit, Z-axial drive unit, and W-axial drive unit of the electric discharge machine 100. FIG. 4 is a view showing the state of using the X-axial drive unit, Y-axial drive unit, Z-axial drive unit, and W-axial drive unit to attach the shuttle 60 of the electrode guide assembly 10 connected to the electrode holder 114 attached to the front end of the spindle 112 (not shown) to the W-axis chuck 144. Note that, in FIG. 4, illustration of the electrode 116 is omitted. When attaching the shuttle 60 of the electrode guide assembly 10 to the W-axis chuck 144, first, the electrode guide assembly 10 is moved in the horizontal direction $A_H$, for example, the X-axial direction, and the guide tube 20 is passed through the open part 146 of the W-axis chuck 144 to introduce it into the W-axis chuck 144, then the electrode guide assembly 10 is made to move in the vertical direction $A_V$ to engage the shuttle 60 with the W-axis chuck 144. This state is shown in FIG. 5.

As shown in FIG. 4 and FIG. 5, at the time of exchange, the electrode guide assembly 10 is handled integrally with the electrode holder 114 and electrode 116 (not shown) since the shuttle 60 is connected to the electrode holder 114. However, at the time of machining, due to the rotational angle control function of the spindle 112, as shown in FIG. 1, the electrode holder 114 rotates by a predetermined angle with respect to the shuttle 60, the connection between the two is broken, and the shuttle 60 held at the W-axis chuck 144 separates downward from the electrode holder 114 held at the spindle 112.

FIG. 5 shows the state where the guide tube 20 of the electrode guide assembly 10 extends in the direction of the open part 146 of the W-axis chuck 144, that is, in the XZ plane. However, the present embodiment is configured so that the shuttle 60 can rotate about the axis Rz with respect to the W-axis chuck 144 and can be locked at any angle. As a result, it is possible to set the azimuth of the positioning guide 24 of the guide tube 20 centered on the axis Rz, that is, the angle about the axis Rz, to any angle in 360 degrees. The azimuth of the positioning guide 24 of the guide tube 20 is set by driving rotation of the electrode holder 114 connected to the shuttle 60 in the state shown in FIG. 5 at an extremely low speed by the rotational angle control function of the spindle 112. The spindle drive unit of the electric discharge machine 100 according to the present embodiment is configured to be able to be switched between high speed rotation at the time of machining relating to driving of the spindle 112 and extremely low speed rotation where such rotational angle control is performed.

Figure 6:
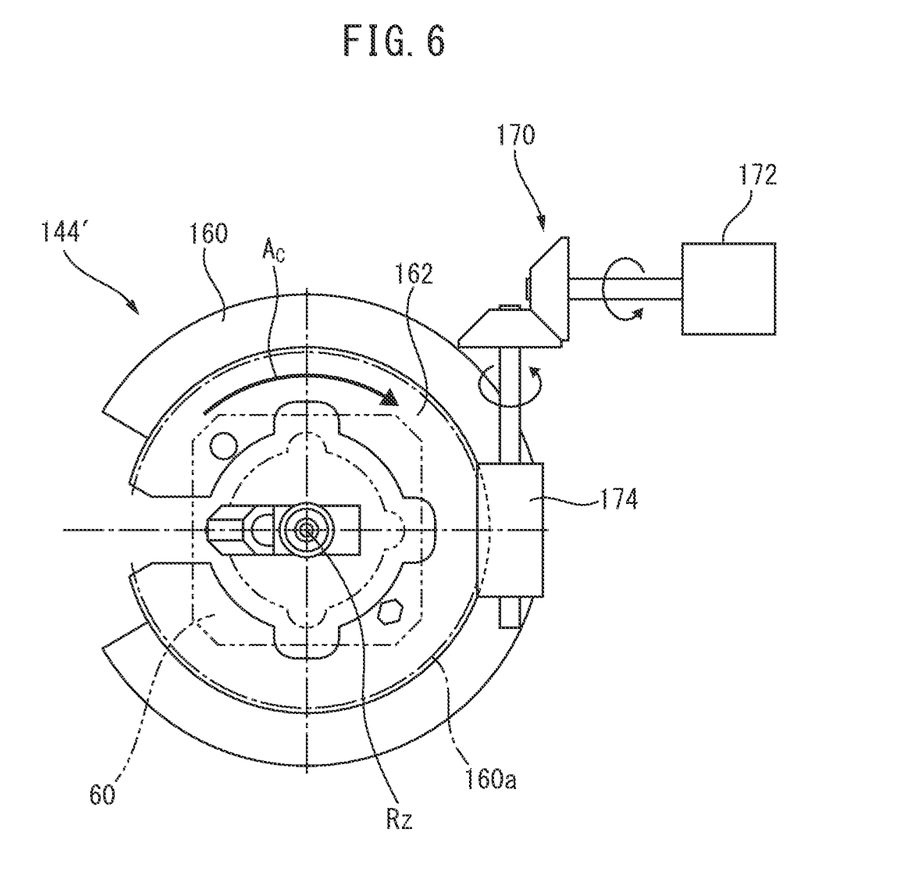
FIG. 6 is a schematic plan view of a modification of a W-axis chuck.

To set the azimuth of the positioning guide 24 of the guide tube 20, as another embodiment for making the shuttle 60 rotate about the axis Rz, there is the one shown in FIG. 6. Referring to FIG. 6, the W-axis chuck 144' is provided with an approximately circular-shaped outside frame 160 and a chuck 162 attached to the outside frame 160 to be able to rotate about the axis Rz and formed with teeth at the outer circumferential surface. The chuck 162 is driven to rotate by a gear drive by the drive motor 172, for example, by a worm gear 174. In the example shown in FIG. 6, as shown by the arrow Ac, the chuck 162 is made to rotate about the axis Rz whereby the shuttle 60 rotates about the axis Rz. Due to this, it is possible to set the azimuth of the positioning guide 24 of the guide tube 20 at a desired angle.

According to the electric discharge machine 100 of the first embodiment configured as explained above, for example, the front end of the electrode 116 (not shown) can be accurately positioned even with respect to a machining point Pm at the surface of the blade 130 which could not be reached by an electrode 320 extending straight coaxially with the axis Rz of the spindle, shown by the virtual line in FIG. 3, without interfering with other parts of the blade 130 and the adjoining blade 130. Further, it becomes possible to make the electrode 116 and workpiece 130 move relatively to drill a small hole. The part of the small-hole near the machining point Pm at the surface of the workpiece 130 forms a diffuser part with a flaring shape with a gradient. The depth side in that depth direction forms a simple columnar-shaped small-hole part. Due to relative movement between the pipe-shaped electrode 116 and workpiece 130 according to the machining program, this diffuser part and columnar-shaped small-hole part are formed by electric discharge machining.

Further, according to the present embodiment, it is possible to set the azimuth of the positioning guide 24 of the guide tube 20 relative to the axis Rz to any angle, so the possibility of the guide tube 20 being able to be arranged so as not to interfere with the workpiece 130 is further raised.

In the electric discharge machine 100 of the present embodiment, when the operator positions the front end of the electrode 116 at the machining point Pm, compared with the conventional type where the electrode extends straight, it becomes necessary to consider the amount of shift S of the guide tube 20. However, this is a minor problem for an operator. Further, the same is true for the machining programmer. That is to say, normally the operator and machining programmer understand that the drilling is performed in the Z-axial direction, but the positioning of the electrode 116 of the electric discharge machine 100 at the machining point Pm or preparation of the machining program for the same according to the present invention can be performed within the range of normal understanding. That is, the machining program may be prepared by just assuming the electrode extends in the axis Rz direction and setting the amount of offset of the tool diameter direction of the numerical control device when machining to a value corresponding to the amount of shift S.

Next, an electric discharge machine according to a second embodiment of the present invention will be explained. This electric discharge machine differs in the electrode guide assembly 210 from that described above, so the electrode guide assembly 210 will be explained below referring to FIG. 7 focusing on the points of difference. Note that, component elements in the second embodiment similar to the component elements in the first embodiment are assigned the same reference notations.

Figure 7:
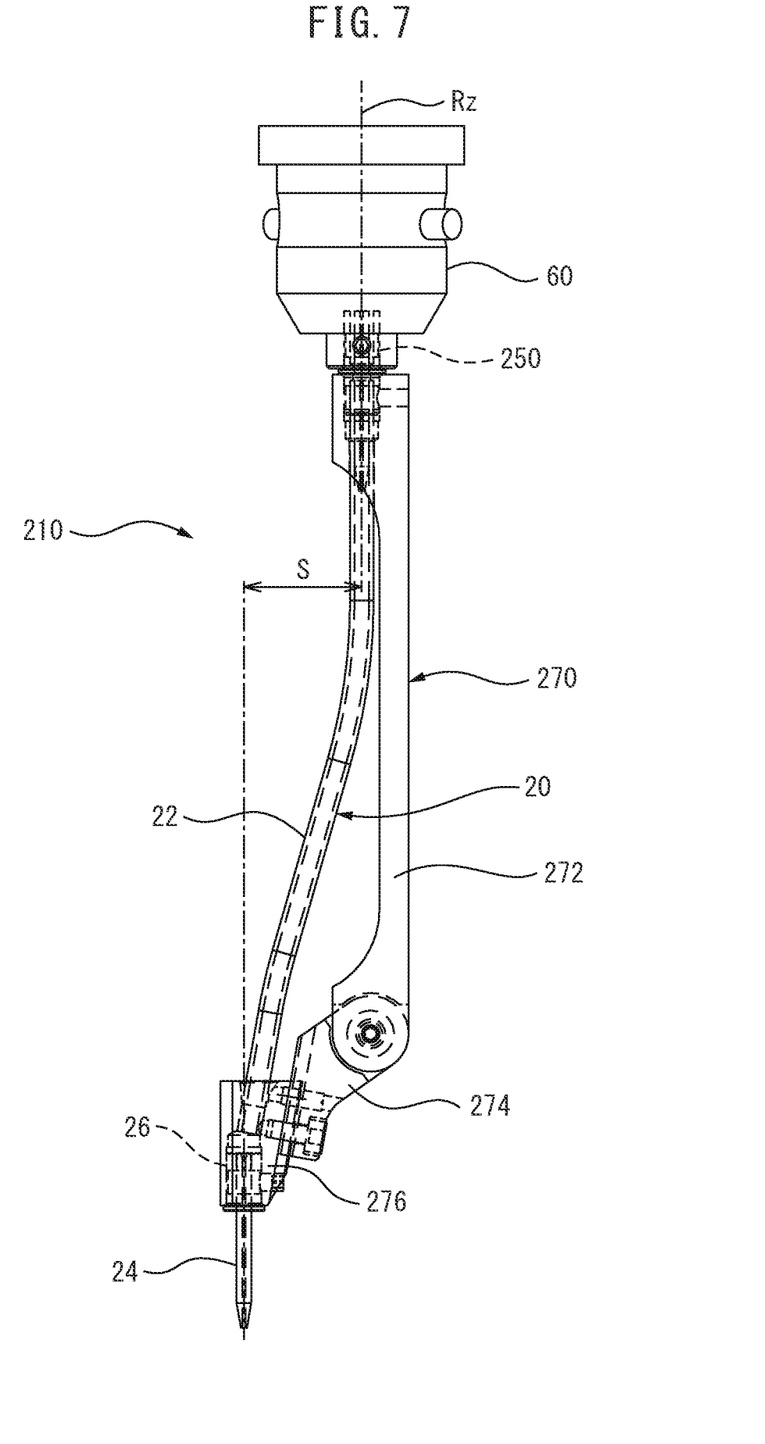
FIG. 7 is a front view of an electrode guide assembly of an electric discharge machine according to a second embodiment.

The electrode guide assembly 210 in the second embodiment has a shuttle 60, a connecting part 250 fixed to the shuttle 60, a guide tube 20 fixed to the connecting part 250 and extending with an amount of shift S, and further a tube support 270. In this way, the electrode guide assembly 210 in the second embodiment differs from the electrode guide assembly 10 in the first embodiment in the points of having the tube support 270 and of not having the parallelism adjusting unit 30.

The guide tube 20, in the same way as the first embodiment, has a large diameter tube 22, a positioning guide 24, and a connecting member 26 connecting these. However, the large diameter tube 22 of the second embodiment is formed not from metal, but a flexible plastic material.

The tube support 270 is provided with an elongated main member 272 extending at the side of the large diameter tube 22 of the guide tube 20 downward from the base end side, a pivoting member 274 connected to the bottom end part of the main member 272 to be able to pivot about an axis in a direction perpendicular to the axis Rz, and a front end member 276 fixed to the pivoting member 274 by a setscrew. The main member 272 is fixed at its top end part to the connecting part 250 by a setscrew. The front end member 276 holds the connecting member 26 of the guide tube 20 so that the positioning guide 24 of the guide tube 20 extends in parallel to the axis Rz of the spindle 112. In the electrode guide assembly 210 in the second embodiment, the front end part of the guide tube 20 is held by the front end member 276 of the tube support 270 whereby the position and direction of the positioning guide 24 are determined.

In the second embodiment, the amount of shift S is determined by the tube support 270, so the large diameter tube 22 of the guide tube 20 can be made using a flexible plastic. Further, there is no need for shaping it into a crank shape like in the case of the first embodiment. Further, the pivot member 274 is usually adjusted by twisting and then fastened to the main member 272 so that the axis of the positioning guide 24 extends in parallel to the axis Rz of the spindle 112, but it is also possible in accordance with need that it be fastened so as to extend at a slant from the axis Rz.

The invention claimed is:

1. A hole electric discharge machine applying voltage between a hole machining-use electrode attached to a spindle and a workpiece attached to a table to drill a hole in the workpiece by electric discharge energy, the hole electric discharge machine comprising:
   an electrode elongated in a direction;
   an electrode guide having a crank shape and having a hollow part through which the electrode is passed, and guiding the electrode at a front end of the hollow part in a parallel with an axis of the spindle while shifted by a predetermined distance in a perpendicular direction from the axis of the spindle, the electrode guide comprising,
      a first tube having a first inside diameter into which the electrode is inserted and which comprises a top straight part extending along the axis of the spindle, a bottom straight part extending in parallel with the top straight part, and a slanted part connecting the top straight part and the bottom straight part,
      a second tube having a second inside diameter, the second tube being connected to the bottom straight part of the first tube in parallel with the axis of the spindle and guiding a front end part of the electrode, the second inside diameter being smaller than the first inside diameter, and
      a connecting member connecting the bottom straight part of the first tube and the second tube guiding the front end part of the electrode; and
   an electrode guide supporter that supports the electrode guide so that a position of the front end of the electrode guide in a direction of the axis of the spindle and an angular position about the axis of the spindle become predetermined values.

2. The hole electric discharge machine according to claim 1 wherein the electrode guide supporter is a W-axis chuck provided at a front end part of a guide arm moving in direction of a W-axis parallel to the axis of the spindle.

3. The hole electric discharge machine according to claim 1 wherein the electrode guide comprises at a base end part of the electrode guide a parallelism adjuster that adjust the positioning guide attached to the front end part so that the positioning guide becomes parallel to the axis of the spindle.

4. The hole electric discharge machine according to claim 1 wherein the electrode guide supporter is configured to be able to rotate the electrode guide about an axis of rotation of the electrode whereby an angular position of the electrode guide in a shift direction can be changed.

5. The hole electric discharge machine according to claim 1 wherein the electrode guide comprises a front end part configured to be pivotable about an axis in a direction perpendicular to the axis of the spindle whereby a front end part of the electrode guide can be made to slant with respect to the spindle axis from a parallel state.

6. The hole electric discharge machine according to claim 1 wherein the electrode guide comprises a flexible tube able to be changed in amount of shift.

* * * * *